United States Patent [19]
Rossi

[11] 3,853,892
[45] Dec. 10, 1974

[54] 4-[PARA-(1-HYDROXYETHYL)-PHENYL]PIPERIDINES

[75] Inventor: Alberto Rossi, Oberwil/Bl, Switzerland

[73] Assignee: Ciba-Geigy Corporation, Ardsley, N.Y.

[22] Filed: Mar. 7, 1973

[21] Appl. No.: 338,698

Related U.S. Application Data

[63] Continuation-in-part of Ser. No. 41,107, May 27, 1970, Pat. No. 3,801,581.

[30] Foreign Application Priority Data
June 5, 1969 Switzerland.......................... 8650/69
Dec. 11, 1969 Switzerland...................... 18441/69
Apr. 24, 1970 Switzerland......................... 6221/70

[52] U.S. Cl........ 260/293.76, 424/267, 260/293.67, 260/293.75, 260/293.72, 260/293.77, 260/293.81, 260/293.84, 260/297 R, 260/340.9
[51] Int. Cl............................................. C07d 29/30
[58] Field of Search........ 260/293.84, 293.76, 293.8

[56] References Cited
UNITED STATES PATENTS
3,718,743  2/1973  Shen et al......................... 260/293.8

OTHER PUBLICATIONS
Classification Definitions, (June 1966), page 260–4A.

Primary Examiner—Henry R. Jiles
Assistant Examiner—S. D. Winters
Attorney, Agent, or Firm—Joseph G. Kolodny

[57] ABSTRACT

Compounds of the formula

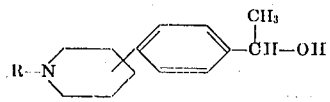

wherein R represents a hydrogen atom or a methyl or acetyl group, and wherein the piperidine ring may also contain an oxo group are usefull as intermediates and as antidepressive agents.

7 Claims, No Drawings

4-[PARA-(1-HYDROXYETHYL)-PHENYL]PIPERIDINES

CROSS-REFERENCE TO OTHER APPLICATIONS

This application is a continuation-in-part of my co-pending application Ser. No. 41,107, filed May 27, 1970, now U.S. Pat. No. 3,801,581.

DISCLOSURE OF THE INVENTION

The present invention provides a compound of the formula

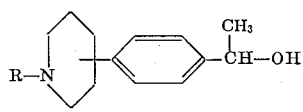

wherein R represents a hydrogen atom or a methyl or acetyl group, and wherein the piperidine ring may also contain an oxo group.

Especially interesting compounds are:
4-[para-(1-hydroxyethyl)-phenyl]-piperidine.
1-acetyl-4-[para-(1-hydroxyethyl)-phenyl]-piperidine.
1-acetyl-3-[para-(1-hydroxyethyl)-phenyl]-piperidine.
1-acetyl-2-[para-(1-hydroxyethyl)-phenyl]-piperidine.
1-methyl-2-oxo-5-[para-(1-hydroxyethyl)-phenyl]-piperidine and
1-methyl-2-oxo-6-[para-(1-hydroxyethyl)-phenyl]-piperidine which are useful intermediate products for the manufacture of α-phenyl-carboxylic acids of the formula II

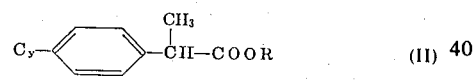

wherein R is hydrogen or ethyl, Cy represents 4-piperidyl. 3-piperidyl, 1-acetyl-4-piperidyl. 1acetyl-3-piperidyl, 1-acetyl-2-piperidyl, 1-methyl-2-oxo-5-piperidyl, 1-methyl-2-oxo-6-piperidyl, or 1-(3,4,5-trimethoxy-benzoyl)-4-piperidyl, which possess valuable pharmacological properties, above all a pronounced anti-inflammatory action as can be shown, for example, in the kaolin oedema test on the rat.

The compounds also possess valuable pharmacological properties, above all a pronounced action upon the central nervous system, especially an antidepressive action, as can be shown, for example, by means of their tetrabenazine-antagonistic action upon the rat at does of 5 to 50 mg/kg i.p They are therefore useful as antidepressives.

Depending on the conditions of the process and the starting materials used the final products are obtained in the free form or in the form of their salts which are likewise included in the invention. Compounds obtained in the free form which contain acid groups, such as carboxylic acids or hydroxamic acids, can be converted in the usual manner, for example, by reaction with appropriate basic agents, into salts with bases, above all into therapeutically useful salts with bases, for example, salts with organic amines, or metal salts. As metal salts there come into consideration above all alkali metal salts or alkaline earth metal salts, such as sodium, potassium, magnesium or calcium salts. From the salts the free compounds can be obtained in the usual manner, for example, by reaction with acid agents. Salts obtained with acids can be converted in a manner in itself, known, for example, with alkalies or ion-exchangers, into the free compounds. From the latter salts can be obtained by reaction with organic or inorganic acids, and especially those capable of forming therapeutically useful salts. As such acids there may be mentioned, for example: hydrochalic acids, sulphuric acids, phosphoric acids, nitric acid, perchloric acid, aliphatic, alicyclic, aromatic or heterocyclic carboxylic or sulphonic acids, such as formic, acetic, propionic, succinic, glycolic, lactic, malic, tartaric, citric, ascorbic, maleic, hydroxy-maleic or pyruvic acid; phenyl-acetic, benzoic, para-amino-benzoic, anthrnilic, para-hydroxybenzoic, salicylic or para-amino-salicylic acid, embonic acid, methane-sulphonic, ethane-sulphonic, hydroxyethane-sulphonic, ethylene sulphonic acid; halogen-benzene sulphonic, toluene sulphonic, naphthalene sulphonic acid or sulphanilic acid; methionine, tryptophan, lysine or arginine. The aforesaid salts or other salts can also be used for purifying the new compounds, for example, by converting the free compounds into their salts, isolating the salts, and again liberating the free compounds. Owing to the close relationship between the new compounds in the free form and in the form of their salts it is to be understood that references to the free compounds in the preceding and following description include also, when appropriate, the corresponding salts.

Depending on the choice of the starting materials and the method of operation and the number of asymmetrical carbon atoms, the new compounds may be present as optical antipodes, racemates or as mixtures of isomers (racemate mixtures).

When mixtures of isomers are obtained (racemate mixtures) the two stereoisomeric (diastereomeric) pure racemates can be separated from one another in known manner on the basis of the physical-chemical differences between the constituents, for example, by chromatography and/or fractional crystallisation.

The racemates obtained can by known methods be split up into the antipodes, for example, by recrystallisation from an optically active solvent, or with the aid of microorganisms, or by reaction with an optically active acid or base that forms a salt with the racemic compound, and separation of the salts so obtained, for example, on the basis of their different solubilities, and from which diastereomers the antipodes can be liberated by the action of suitable means. Especially useful optically active acids are, for example, the D- and L-forms of tartaric acid, di-o-toluyltartaric acid, malic acid, mandelic acid, camphor sulphonic acid or quinie acid. The preferred optically active bases are, for example, brueine, strychnine, morphine, menthylamine and α-phenyl-ethylamine or their quaternary ammonium bases. Advantageously the more active or less toxic of the two antipodes is isolated.

Alternatively, pure isomers, racemates or optical antipodes ccan be produced by using appropriate starting materials in the form of their pure isomers, racemates or optical antipodes.

The new compounds can, for example, be used in the form of pharmaceutical preparations which contain the new compounds in their free form or if desired in the form of salts thereof, especially alkali metal salts, or the therapeutically useful acid addition salts thereof, in a mixture with, for example, a pharmaceutical organic or inorganic, solid or liquid carrier material suitable for enteral, parenteral or topical administration. For preparing the carrier material substances should be used which do not react with the new compounds, for example, water, gelatine, lactose, starches, stearyl alcohol, magnesium stearate, talc, vegetable oils, benzyl alcohols, gums, propylene glycols, white petroleum jelly or other known carriers for medicaments. The pharmaceutical preparations may be in the form, for example, of tablets, dragees, capsules, suppositories, creams, salves or in liquid form as solutions (for example, as an elixir or syrup), suspensions or emulsions. If desired, they may be sterilised and/or may contain auxiliary substances, such as preserving, stabilising, wetting or emulsifying agents, solution promoters or salts for regulating the osmotic pressure or buffers. They may also contain other therapeutically valuable substances. The pharmaceutical preparations are made by the usual methods. The following Examples illustrate the invention:

EXAMPLE 1

A solution of 55 grammes of 1-benzyl-4-(paza-acetylphenyl)-1,2,5,6-tetrahydro-pyridine in 400 ml of glacial acetic acid is hydrogenated in the presence of 10 grammes of palladium-carbon (10% strength) at room temperature and atmospheric pressure until 3 equivalents of hydrogen have been consumed. The catalyst is removed by filtration, the filtrate is evaporated in vacuo, and there are added to the viscous residue ice and a 5N-solution of sodium hydroxide to produce a pH-value of 11. The mixture is extracted with methylene chloride, washed with water, dried over sodium sulphate, and evaporated in vacuo. The solid residue is recrystallised from a mixture of chloroform and petroleum ether, and there is obtained 4-[para-(1-hydroxyethyl)-phenyl]-piperidine melting at 132–133°C.

The 1-benzyl-4-(p-acetylphenyl)-1,2,5,6-tetrahydropyridine used as starting material can be obtained in the following manner:

To a well stirred suspension of 9.8 grammes of magnesium chippings, which have been washed with chloroform and activated with iodine, in 100ml of absolute tetrahydrofuran there is added dropwise at 60°C a solution of 96 grammes of 2-(para-bromophenyl)-2-methyl-1,3-dioxolane in 100 ml of absolute tetrahydrofuran. The rate of the drops is so regulated that the temperature does not exceed 60°C after the reaction has begun. At the end the whole is heated for 30 minutes at 60°C, cooled to 5°C, and then there is added dropwise, while stirring, a solution of 70 grammes of 1-benzyl-4-piperidone in 100 ml of absolute tetrahydrofuran. After heating the mixture for 1 hour at 40°–50°C, the reaction mixture is filtered off and evaporated in a rotary evaporator in vacuo. To the residue there are added ice and a saturated aqueous solution of ammonium chloride. The whole is extracted with ether (total quantity 1500 ml), dried over sodium sulphate, and concentrated by evaporation to two thirds of its volume. Crystals are precipitated out by cooling the mixture in an ice bath, and the crystals are filtered off and recrystallised from ethanol to yield 2-[para-(1-benzyl-4-hydroxy-4-piperidyl)-phenyl]-2-methyl-1,3-dioxolane melting at 116°–117°C. The hydrochloride of this compound melts at 240°–241°C with decomposition.

A solution of 110 grammes of the base so obtained in 500 ml of concentrated hydrochloric acid is heated for 3 hours at 100°C. The mixture is cooled, its pH-value is adjusted to 9–10 with a 10N-solution sodium hydroxide, and extracted with chloroform. The chloroform extracts are washed with water, dried over sodium sulphate, and evaporated. The residue is dissolved warm in 500 ml of ether. After cooling the solution, 1-benzyl-4-(p-acetylphenyl)-1,2,5,6-tetrahydro-pyridine melting at 99°–100°C crystallises out.

EXAMPLE 2

17 ml of acetic anhydride are added dropwise at 40°C, while stirring, to a solution of 34 grammes of 4-[para-(1-hydroxyethyl)-phenyl]-piperidine in 200 ml of ethyl acetate and 80 ml of ether. After being stirred at that temperature for 1 hour, the mixture is cooled, then filtered, and ether and pentane area added to the filtrate until crystallisation occurs. The crystals are filtered off and there is obtained 1-acetyl-4-[para-(1-hydroxyethyl)-phenyl]-piperidine melting at 119°–120°C.

20 ml of thionyl chloride are slowly added to a solution of 20 grammes of the latter hydroxy-compound in 1000 ml of absolute benzene, while stirring, at 50°C, and the whole is allowed to stand at room temperature for one hour. The mixture is then evaporated in vacuo, and the residue is taken up in ether and washed with ice-water. The ethereal extracts are dried over sodium sulphate, and evaporated in vacuo to yield crude 1-acetyl-4-[para-(1-chlor-ethyl)-piperidine in the form of a viscous oil. A solution of 22 grammes of this chloride in 50 ml of dimethyl-sulphoxide is added dropwise, while stirring, to a suspension heated to 80°–90°C of 8 grammes of powdered dry sodium cyanide in 100 ml of dimethyl-sulphoxide. When the addition is complete, the reaction mixture is maintained at the same temperature for a further two hours. The mixture is then cooled, 500 ml of water are added, and the whole is extracted with ethyl acetate. The ethyl acetate extracts are dried over sodium sulphate, and evaporated in vacuo to yield crude 1-acetyl-4-[para-(1-cyanethyl)-phenyl]-piperidine in the form of a viscous oil (the infra-red spectrum shows a nitrile band at $4.52\mu$).

A solution of 12 grammes of 1-acetyl-4-[para-(1-cyanethyl)-phenyl]-piperidine and 6 grammes of potassium hydroxide in 150 ml of ethanol and 50 ml of water is boiled for 24 hours under reflux, during which ammonia is evolved.

The reaction solution is evaporated in a rotary evaporator, the residue is dissolved in 200 ml of water, and extracted with ether. The aqueous phase is treated with charcoal, filtered off, adjusted to a pH-value of 2–3 with concentrated hydrochlorid acid and evaporated in vacuo at 60°C. The viscous residue dissolved in 50 ml of ethanol and sodium chloride that separates out is filtered off. By evaporating the filtrate in vacuo there is obtained the crude hydrochloride of α-[para-(4-piperidyl)-phenyl]-propionic acid in the form of a viscous mass.

In an analogous manner the α-[para-(1-acetyl-2-piperidyl)-phenyl]-propionic acid of melting point 151°–153°C and α-[para-(3-piperidyl)-phenyl]-propionic acid hydrochloride can be obtained.

EXAMPLE 3

To a solution of 20 grammes of 1-acetyl-4-(para-acetylphenyl)-piperidine in 100 ml of methanol there is added dropwise, while stirring, at 10°C a solution of 7 grammes of sodium borohydride in 50 ml of methanol and 5 ml of water. Fifteen minutes are allowed for further reaction. 200 ml of water are added, and the mixture is extracted with methylene chloride. The methylene chloride extracts are washed with water, dried over sodium sulphate, and evaporated. The solid residue yields, after recrystallisation from a mixture of ether and pentane, 1-acetyl-4[para-(1-hydroxy-ethyl)-phenyl]-piperidine melting at 119 –119.5°C.

The 1-acetyl-4-(para-acetyl phenyl) -piperidine used as starting material can be obtained in the following manner:

To a solution of 23 grammes of 4-phenyl-piperidine in 200 ml of absolute dioxan there are first added 15 grammes of pyridine, while stirring, and then 14.5 grammes of acetyl chloride are added dropwise. After evaporating the mixture in a rotary evaporator in vacuo, there is added ice and an aqueous solution of sodium carbonate, and teh whole is extracted with ether. The etheral extract is dried over sodium sulphate, and yields, after evaporation in vacuo, an oily residue which is distilled in high vacuum. The resulting 1-acetyl-4-phenyl-piperidine has a boiling point of 134°–136°C (0.2 mm of mercury).

To a solution of 22 grammes of this compound in 50 ml of absolute carbon disulphide there are first added 12 grammes of acetyl chloride, then 50 grammes of aluminium chloride are added at room temperature in portions, while stirring energetically, the internal temperature rising to 40°C and a viscous brown reaction mixture being formed. After it has been stirred for a further hour, the whole is poured on to ice and extracted with methylene chloride. The methylene chloride extracts are washed with a 2N-solution of sodium hydroxide and with water, and dried over sodium sulphate and evaporated. The solid residue so obtained yields, after recrystallisation from a mixture of methylene chloride and ether, 1-acetyl-4-(para-acetyl-phenyl)-piperidine melting at 98°–100°C.

EXAMPLE 4

A solution of 20 g of 1-acetyl-2-(para-acetyl phenyl) piperidine in 200 ml of methanol is stirred at 0°C while being treated with 40 ml of water and then portionwise with 7 g of sodium borohydride. The mixture is stirred for another hour at room temperature, then treated with 400 ml of water and extracted with methylene chloride. The methylene chloride extracts are washed with water, dried over sodium sulfate, and evaporated. The oily residue is distilled in high vacuum and yields 1-acetyl-2-[para-(1hydroxy-ethyl)-phenyl]-piperidine boiling at 150°–160°C under a pressure of 0.1 mm of Hg.

The 1-acetyl-2-(para-acetyl phenyl)-piperidine used as starting material can be obtained in the following manner:

A solution of 19 g of 2-phenyl-piperidine in 170 ml of absolute dioxan is stirred, adding first 12.5 g of pyridine, and then dropwise 12 h of acetyl chloride. The batch is evaporated in a rotary evaporator under vacuum, and, after the addition of ice and aqueous sodium carbonate, extracted with ether. The ethereal extracts are dried over sodium sulfate, then evaporated in vacuo, when they yield an oily residue which is distilled in a high vacuum. The resulting 1-acetyl-2-phenyl-piperidine boils at 135°–140°C under a pressure of 0.2 mm Hg.

A solution of 21.5 g of this compound in 100 ml of carbon disulfide is treated first with 12 g of acetyl chloride, then while cooling and stirring vigorously, portionwise with 50 g of aluminium chloride, the internal temperature rising at 35°C. The reaction solution is kept at this temperature for 1hour, and the viscous reaction liquid is then poured on to ice and extracted with methylene chloride. The methylene chloride extracts are washed with 2N-sodium hydroxide solution and with water, dried over sodium sulfate, and evaporated. The resulting oily residue is distilled in a high vacuum and 1-acetyl-2-(para-acetyl-phenyl)-piperidine obtained which boils at 180°–190°C under a pressure of 0.1 mm of Hg.

EXAMPLE 5

A solution of 12 g of 1-acetyl-2-[para-(1hydroxyethyl) phenyl]-piperidine in 300 ml of benzene is heated quickly to 70°C in the presence of 10 ml of thionyl chloride and then allowed to stand at room temperature for 33 hours. The batch is then evaporated under reduced pressure, the residue is dissolved in ether, and the solution washed with ice water. The ethereal extracts are dried over sodium sulfate and on evaporation in vacuo yield crude 1-acetyl-2-[para-(1-chlorethyl)-phenyl]-piperidine in the form of a viscous oil.

A solution of 14 g of this chloride in 100 ml of dimethylsulfoxide is treated with 8 g of sodium cyanide while stirring, and then heated at 90°C for 2 hours. The reaction solution is allowed to stand at room temperature for 16 hours, then treated with 200 ml of water, and extracted with ethyl acetate. The ethyl acetate extracts are dried over sodium sulfate and on evaporation under reduced pressure yield crude 1-acetyl-2-[para-(1-cyanethyl) phenyl]-piperidine as a viscous oil.

Dry hydrogen chloride gas is introduced for 2 hours into a solution, cooled to -10°C of 12 g of 1-acetyl-2-]para (1-cyanethyl)-phenyl]-piperidine in 100 ml of absolute ethanol. The reaction solution is allowed to stand at room temperature for 16 hours, then evaporated under reduced pressure to two thirds of its volume, treated with ice and 50 ml of saturated sodium carbonate solution, then extracted with 2 × 100 ml of ether. The ethereal solution is washed with 100 ml of saturated sodium chloride solution, extracted with 2 × 200 ml of an icecold solution of 10 ml of concentrated sulfuric acid in 190 ml of water. The acid solution is separated and heated at 70°C in a water bath for 1 hour, during which crude α-[para-(1-acetyl 2-piperidyl)-phenyl]-propionic acid ethyl ester separates as an oil.

EXAMPLE 6

A solution of 5 g of 1methyl-2-oxo-5-(para-acetyl phenyl)-piperidine in 40 ml of methanol is stirred at 5°C while 10 ml of water are added, followed by 1.5 g of sodium borohydride. The reaction is allowed to continue for 30 minutes before 100 ml of water are added and the batch is extracted with methylene chloride.

The methylene chloride extracts are washed with water, dried over sodium sulfate, and evaporated. The solid residue is recrystallized from ethyl acetate + petroleum ether and 1-methyl-2-oxo-5-[para-(1-hydroxyethyl)-phenyl]-piperidine obtained which melts at 120°–122°C.

The 1-methyl-2-oxo-5-(para-acetyl-phenyl)-piperidine used as starting material can be obtained in the following manner:

A solution of 17.5 g of 2-oxo-5-phenyl-piperidine in 300 ml of absolute dioxan is heated to 40°C and treated portionwise, while stirring, with 7.2 g of sodium hydride (50% strength). Stirring is continued for another hour at this temperature, a thick precipitate forming. The batch is cooled to 40°C and treated dropwise with 28.2 g of methyl iodide, whereupon the precipitate passes into solution, and dosium iodide precipitates. Stirring is continued for another hour at 60°C, followed by filtration while the batch is still hot, and evaporation under reduced pressure. When the residue is recrystallized from ethyl acetate + petroleum ether, 1-methyl-2-oxo-5-phenyl-piperidine of melting point 103–105°C is obtained.

A solution of 9.5 g of this compound in 50 ml of absolute carbon disulfide is treated first with 4.7 g of acetyl chloride, then at room temperature portionwise with 23 g of aluminium chloride while stirring vigorously and while cooling. The batch is stirred at room temperature for another 30 minutes, then poured on to ice, and extracted with methylene chloride. The methylene chloride extracts are washed with 2N-sodium hydroxide solution and with water, dried over sodium sulfate, and evaporated. The resulting solid residue is recrystallized from ethyl acetate + ether and 1-methyl-2-oxo-5-(para-acetyl-phenyl) piperidine of melting point 107–108°C obtained.

EXAMPLE 7

A solution of 4.5 g of 1-methyl-2-oxo-5-[para-(1-hydroxyethyl)-phenyl]-piperidine compound in 20 ml of absolute benzene is allowed to stand at room temperature for 2 hours in the presence of 2 ml of thionyl chloride. The batch is evaporated under reduced pressure, the residue is treated with ice, neutralized with aqueous sodium carbonate solution, extracted with benzene, and evaporated under reduced pressure, 5 g of the 1-methyl-2-oxo-5-[para-(1-chlorethyl)-phenyl]-piperidine so obtained are dissolved in 50 ml of dimethylsulfoxide and treated at 50°C while stirring with 2 g of sodium cyanide. The batch is heated at 100°C for 1 hour, then cooled, and treated with 100 ml of water. The aqueous solution is extracted with methylene chloride, the organic extracts are dried over sodium sulfate, and evaporated. The solid residue is recrystallized from ethyl acetate + petroleum ether, and 1-methyl-2-oxo-5-[para-(1-cyanethyl) phenyl]-piperidine obtained which melts at 114°–116°C.

Dry hydrogen chloride gas is introduced for 1 hour into a solution, cooled to -10°C of 3 g of 1-methyl-2-oxo-5-[para (1-cyanethyl)-phenyl]-piperidine in 20 ml of ethanol. The reaction solution is allowed to stand at room temperature for 16 hours, then evaporated under reduced pressure to two-thirds of its volume, treated with ice and with 20 ml of saturated sodium carbonate solution, and extracted with 3 × 50 ml of ether. The ethereal solution is washed with 50 ml of saturated sodium chloride solution and extracted with an ice-cold solution of 5 ml of concentrated sulfuric acid in 95 ml of water in 2 portions. The acid extracts are separated and heated at 60°C in a water bath for 1 hour, during which an oil separates. The batch is extracted with ether, the ethereal extract is dried over sodium sulfate and evaporated under reduced pressure to obtain α-[para(1-methyl-2-oxo-5-piperidyl)-phenyl]-propionic acid ethyl ester in the form of a faintly yellowish oil.

A solution of 2.5 g of α-[para-(1-methyl-2-oxo-5-piperidyl) -phenyl]-propionic acid ethyl ester in 30 ml of ethanol is mixed with 10 ml of 2N-sodium hydroxide solution and the mixture allowed to stand at room temperature for 3 hours. It is then evaporated under reduced pressure, the residue is dissolved in water, filtered, and acidified with 2N-hydrochloric acid, then extracted wtih methylene chloride. The methylene chloride extracts are dried over sodium sulfate and evaporated in vacuo, and the residue rcrystallized from ether + petroleum ether. and α-[para-(1-methyl-2-oxo-5-piperidyl)-phenyl]-propionic acid obtained as colorless crystals which melt at 181°–182°C.

EXAMPLE 8

To a solution, cooled to 0°C, of 40 ml of water in 160 ml of methanol are added first 7 g of sodium borohydride, then, while stirring 20 g of 1-methyl-2-oxo-6-(para-acetyl-phenyl)-piperidine and the whole is stirred at room temperature for 1hour. The batch is then treated with water, extracted with water, extracted with methylene chloride, washed with water, the organic extracts are dried over sodium sulfate, and evaporated in vacuo. The oily residue is distilled in a high vacuum and 1-methyl-2-oxo-6-[para-(1-hydroxyethyl)-phenyl]-piperidine obtained which boils at 170°–175°C under a pressure of 0.2 mm of Hg.

The 1-methyl-2-oxo-6-(para-acetyl-phenyl)piperidine used as starting material can be obtained as follows:

20 g of 2-oxo-6-phenyl-piperidine are added to a suspension of 8.2 g of sodium hydride (50% in oil) in 350 ml of absolute dioxan, while stirring, and the mixture is then heated at 60°C for 2 hours. The reaction solution is cooled to 40°C, then treated wth 32 g of methyliodide, and stirred for another hour at 60°C. The precipitated sodium iodide is filtered off, and the solution evaporated under reduced pressure. The residue is recrystallized from ether + petroleum ether, and 1-methyl-2-oxo-6-phenyl-piperidine obtained which melts at 77°–78°C.

A suspension of 92 g of aluminium chloride in 200 ml of carbon disulfide is mixed at room temperature, while stirring with 36 g of 1-methyl-2-oxo-6-phenyl-piperidine. The mixture is heated at 40°C for a short while, then cooled to 20°C, and 20 g of acetyl chloride are added dropwise. The mixture is heated at 40°C for 2 hours, then cooled, and poured on to ice. The solution is extracted with methylene chloride, washed with 2N-sodium hydroxide solution and with water, dried over sodium sulfate, and evaporated under reduced pressure. The oily residue is the crude 1-methyl-2-oxo-6-(para-acetyl-phenyl)-piperidine.

EXAMPLE 9

A solution of 20 g of 1-methyl-2-oxo-6-(para(1-hydroxyethyl)-phenyl]-piperidine in 400 ml of absolute benzene is mixed with 15 ml of thionyl chloride and allowed to stand at room temperature for 5 hours. On evaporation under reduced pressure, crude 1-methyl-2-oxo-6-[para-(1-chloro)-phenyl]-piperidine is obtained as an oil. A solution of 22 g of this chloride in 200 ml of dimethysulfoxide is treated with 10 g of sodium cyanide and stirred while being heated at 90°C for 2 hours. After cooling, 400 ml of water are admixed, and the batch is extracted with a 1 : 1 mixture of ethyl acetate and ether. The organic extracts are dried over sodium sulfate and evaporated. The residue is dissolved in ether, a solid constituent not passing into solution. The ethereal solution is filtered off, evaporated in vacuo, and the oily residue is distilled in a high vacuum to obtain 1-methyl-2-oxo-6-[para-(1cyanethyl)-phenyl] -piperidine of boiling point 180°–200°C (0.5 mm of Hg. (IR spectrum : nitrile band at 4.48 $\mu$).

Dry hydrogen chloride gas is introduced for an hour and a half into a solution cooled to −10°C of 11 g of 1-methyl-2-oxo-6-[para-(1-cyanethyl)-phenyl]-piperidine in 120 ml of absolute ethanol. The batch is allowed to stand at room temperature for 16 hours, then evaporated under reduced pressure, and the residue treated with 50 ml of ice-cold 2N-sodium carbonate solution, and the solution extracted with 3 × 150 ml of ether. The ethereal extracts are washed with 100 ml of ice-cold, saturated sodium chloride solution, then extracted with 2 × 120 ml of an ice-cold solution of 15 ml of concentrated sulfuric acid in 105 ml of water. The acid extracts are separated and heated at 60°C for 30 minutes, during which an oil separates. The batch is extracted with ether, the extract is dried over sodium sulfate, and evaporated under reduced pressure. The oily residue is α-[para-(1-methyl-2-oxo-6-piperidyl)-phenyl]-propionic acid ethyl ester.

A solution of 8 g of α-[para-(1-methyl-2-oxo-6-piperidyl)-phenyl]-propionic acid ethyl ester in 100 ml of ethanol is mixed with 100 ml of N-sodium hydroxide solution, then allowed to stand at room temperature for 2 hours. The batch is evaporated under reduced pressure, the residue dissolved in water, the solution is filtered, and the filtrate acidified with 2N-hydrochloric acid and extracted with ether. When the ethereal extracts are dried over sodium sulfate and evaporated in vacuo, they yield an oily residue. A solution of the oil in ether is mixed wtih the calculated quantity of 10N-sodium hydroxide solution, while shaking, upon which the sodium salt of α-[para(1-methyl-2-oxo-6-piperidyl)-phenyl]-propionic acid is obtained in the form of colorless crystals which do not melt up to 300°C.

EXAMPLE 10

A solution of 12 g of 1-acetyl-3-(para-acetyl-phenyl)-piperidine is added dropwise, while stirring, to a solution, cooled to 0°–5°C of 3 g of sodium borohydride in 100 ml of methanol and 20 ml of water. The reaction is allowed to proceed at 5°C for 1 hour, and at room temperature for 5 hours. The batch is then evaporated, mainly under reduced pressure, treated with water, and extracted with methylene chloride. The methylene chloride solution is dried over sodium sulfate and evaporated in vacuo, and the residue is distilled in a high vacuum to obtain 1-acetyl-3-[(para-(1-hydroxyethyl)-phenyl]-piperidine boiling at 190°C under a pressure of 0.1 mm of Hg.

The 1-acetyl-3-(para-acetyl-phenyl)-piperidine used as starting material in this Example can be prepared as follows:

17.5 g of 2-oxo-5-phenyl-piperdine are added in small portions to a suspension of 5 g of lithium aluminium hydride in 250 ml of absolute dioxan while stirring at 80°C. The reaction is then allowed to continue at this temperature for 2 more hours. The batch is cooled in an ice-bath, treated dropwise with 20 ml of water while stirring vigorously, then filtered, and the filtrate evaporated in vacuo. The residue is distilled in a high vacuum to obtain 3-phenyl-piperidine as a faintly yellow oil boiling at 100°C under a pressure of 0.2 mm of Hg.

A solution of 11.5 g of this compound in 100 ml of absolute dioxan is treated first with 7.5 g of absolute pyridine, then dropwise while stirring with 7.25 g of acetyl chloride. The reaction is allowed to proceed for another hour at room temperature and the batch then evaporated under reduced pressure, the residue treated with ice and aqueous sodium carbonate solution, and finally extracted with ether. The ethereal extracts are extracted by agitation with 2N-hydrochloric acid, the extracts are dried over sodium sulfate and evaporated in vacuo. The residue is distilled in a high vacuum and yields 1-acetyl-3-phenyl-piperidine which boils at 130°–135°C under a pressure of 0.2 mm of Hg.

A solution of 11 g of this compound in absolute carbon disulfide is treated first with 6 g of acetyl chloride, then with 25 g of aluminium chloride while cooling with ice and stirring vigorously. Stirring is continued at room temperature for 1 hour and then at 35°C for 1 hour. The reaction mass is poured on to ice and extracted with methylene chloride. The organic extracts are dried over sodium sulfate and evaporated in vacuo, and the residue distilled in high vacuum to obtain 1-acetyl-3-(para-acetyl-phenyl)-piperidine as a colorless oil which boils at 190°C under a pressure of 0.1 mm of Hg.

EXAMPLE 11

A solution of 13 g of 1-acetyl-3-[para-(1-hydroxyethyl)phenyl]-piperidine in 300 ml of absolute benzene is stirred while being slowly mixed with 10 ml of thionyl chloride, and then heated at 80°C for half an hour. The batch is evaporated in vacuo and the viscous residue is treated with ice and aqueous saturated sodium carbonate solution, and extracted with ether. The ethereal extract is dried over sodium sulfate and evaporated to give crude 1-acetyl-3-[para-(1-chlorethyl)-phenyl]-piperidine as a reddish oil.

A solution of 10 g of this chloride in 100 ml of dimethylsulfoxide is treated dropwise with 5 g of sodium cyanide while stirring. The batch is heated at 90°C for 2 hours, then cooled to room temperature, 200 ml of water are added, and the batch is extracted with ethyl acetate. The ethyl acetate are dried over sodium sulfate and evaporated under reduced pressure. The yeild crude 1-acetyl-3-[para-(1-cyanethyl)-phenyl]-piperidine (IR spectrum : nitrile band at 4.5 $\mu$).

A solution of 10 g of 1-acetyl-3-[para-(1-cyanethyl)phenyl]-piperidine in 150 ml of ethanol is treated with a solution of 5 g of KOH in 20 ml of water, and the whole is refluxed for 15 hours. The batch is evaporated under reduced pressure, the residue is dissolved in water, and the solution extracted with ether. The alkaline aqueous solution is adjusted to pH 3 with concentrated hydrochloric acid, filtered and evaporated in vacuo until constant weight is achieved. The residue is dissolved in 50 ml of absolute ethanol, filtered to remove insoluble potassium chloride, then evaporated under reduced pressure. The oily residue is α-[para-(3-piperidyl)-phenyl]-propionic acid hydrochloride.

EXAMPLE 11

To a solution of 6 g of α-[para-(4-piperidyl)-phenyl]propionic acid ethyl ester in 100 ml of absolute dioxan are added while stirring, first 2.2 g of pyridine, the 6.5 g of 3,4,5-trimethoxybenzoyl chloride, and the mixture is allowed to react for 3 hours at room temperature, the pyridine hydrochloride precipitating. The batch is finally evaporated in vacuo, the residue treated with ice, and extracted with ether. The ethereal extracts are washed with N-hydrochloric acid and with water, dried over sodium sulfate, and evaporated in vacuo. The oily residue is α-[para-{1-(3,4,5-trimethoxy-benzoyl)-4-piperidyl}-phenyl]-propionic acid ethyl ester.

EXAMPLE 13

A solution of 12 g of α-[para-{1-(3,4,5-trimethoxy benzoly)-4-piperidy } -phenyl]-propionix acid ethyl ester in 50 ml of ethanol is mixed with a solution of 1.5 g of sodium hydroxide in 20 ml of water and the mixture allowed to stand at room temperature for 1 hour. The bulk of the ethanol is distilled off under reduced pressure, the remainder is treated with water, filtered through diatomaceous earth, and acidified with 2N-hydrochloric acid. The precipitate which forms is dissolved in chloroform, the chloroformic solution is dried over sodium sulfate and evaporated under reduced pressure. On recrystallization from chloroform + ether the residue yields α-[para-{1-(3,4,5-trimethoxybenzoyl)-4-piperidyl}-phenyl]-propionic acid in the form of colorless crystals of melting point 186°–188°C.

I claim:
1. A compound of the formula

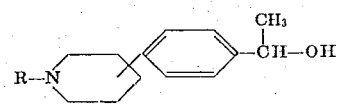

wherein R represents a hydrogen atom or a methyl or acetyl group, and wherein the piperidine ring may optionally contain one oxo group directly attached to the 2-position of the ring, or a therapeutically useful acid addition salt thereof.

2. A compound as claimed in claim 1, said compound being 4-[para-(1-hydroxyethyl)-phenyl]-piperidine or a therapeutically useful acid addition salt thereof.

3. A compound as claimed in claim 1, said compound being 1-acetyl-4-[-1-hydroxyethyl)-phenyl]-piperidine.

4. A compound as claimed in claim 1, said compound being 1-acetyl-3-[para-(1-hydroxyethyl)-phenyl]-piperidine.

5. A compound as claimed in claim 1, said compound being 1-acetyl-2-[para-(1-hydroxyethyl)-phenyl]-piperidine.

6. A compound as claimed in claim 1, said compound being 1-methyl-2-oxo-5-[para-(1-hydroxyethyl)-phenyl]-piperidine.

7. A compound as claimed in claim 1, said compound being 1-methyl-2-oxo-6-[para-(1-hydroxyethyl)-phenyl]-piperidine.

* * * * *

UNITED STATES PATENT OFFICE
CERTIFICATE OF CORRECTION

PATENT NO. : 3,853,892
DATED : December 10, 1974
INVENTOR(S) : Alberto Rossi

It is certified that error appears in the above-identified patent and that said Letters Patent are hereby corrected as shown below:

Column 12, line 22 should read --- being 1-acetyl-4-[para-(1-hydroxyethyl)-phenyl]-piperidine. ---

Signed and sealed this 15th day of July 1975.

(SEAL)
Attest:

RUTH C. MASON
Attesting Officer

C. MARSHALL DANN
Commissioner of Patents
and Trademarks